May 15, 1923.
C. R. CROSON ET AL
1,455,080
DUST CAP FOR TIRE VALVES
Filed Aug. 11, 1922
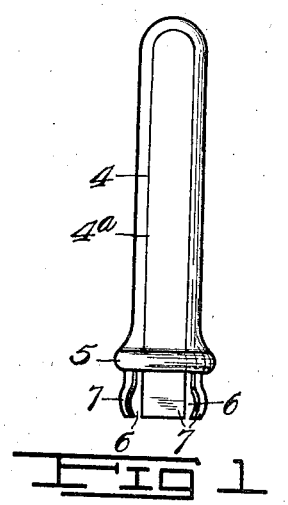
Fig 1
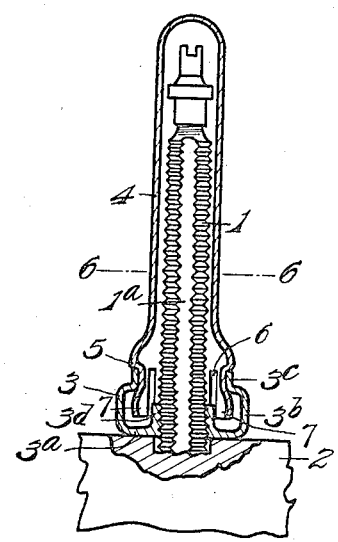
Fig 2
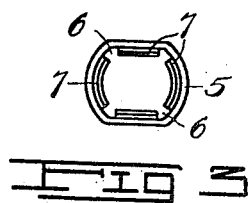
Fig 3
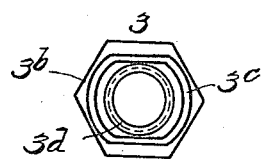
Fig 4
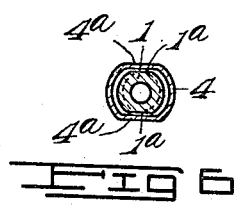
Fig 6
Fig 5
Inventors
Clyde R. Croson and
Jacob W. Kindelberger.
By N. E. Dunlap
Attorney Patented May 15, 1923.

1,455,080

UNITED STATES PATENT OFFICE.

CLYDE R. CROSON AND JACOB W. KINDELBERGER, OF WHEELING, WEST VIRGINIA.

DUST CAP FOR TIRE VALVES.

Application filed August 11, 1922. Serial No. 581,230.

*To all whom it may concern:*

Be it known that we, CLYDE R. CROSON and JACOB W. KINDELBERGER, citizens of the United States of America, and residents of Wheeling, county of Ohio, and State of West Virginia, have invented certain new and useful Improvements in Dust Caps for Tire Valves, of which the following is a specification.

This invention relates broadly to valves for pneumatic tire tubes, and more specifically to a dust cap for such valves.

The primary object of the invention is to provide, in association with the usual threaded stem of a pneumatic tire valve, a dust cap which may be quickly attached to and detached from said stem, as occasion requires, without rotation and which is positively locked against chance displacement when its seated position is assumed.

A further object is to provide a dust cap and rim nut structure in which each is interlocked with the other in such manner that each is positively held against chance displacement.

In describing the invention in detail, reference is herein had to the accompanying drawings, in which—

Figure 1 is a side elevation of the dust cap;

Figure 2 is a longitudinal section of the dust cap and rim nut applied;

Figure 3 is an inner end view of the dust cap;

Figure 4 is a top plan view of the rim nut;

Figure 5 is a view of the rim nut partly in side elevation and partly in vertical section; and—

Figure 6 is a cross section on line 6—6, Fig. 2.

Referring to said drawings, 1 indicates an exteriorly threaded tire-valve stem, and 2 the rim or felly of the wheel, said stem being projected outward through said felly and having oppositely disposed sides $1^a$ thereof flattened somewhat, the threads being terminated at said sides, as ordinarily.

Screwed upon the stem 1 into tight bearing relation to the rim 2 is a rim nut 3 which is formed of sheet metal, the same being shaped to provide a flat base portion $3^a$, a polygonal body $3^b$, a reduced neck portion $3^c$ at the upper end of said body, and a neck $3^d$ extending upwardly from said bottom portion $3^a$ and disposed inwardly of said body. Said neck $3^d$ is internally threaded to correspond with the valve stem 1 and is adapted to be screwed upon the latter, as shown in Fig. 2.

Arranged for enclosing the projecting stem 1 is a dust cap formed of sheet metal and comprising a hollow body 4 with its outer end closed. Said body 4 is made of oblong form in cross section, having opposite flat panel-like sides $4^a$ designed to lie in such close proximity to the flattened sides $1^a$ of the stem that rotation of said cap with respect to said stem is positively prevented. The inner portion of the dust cap is of materially greater diameter than the body 4 thereof, the same being pressed outwardly into approximately bell shape and having an annular outwardly pressed bead 5 formed therein at a spaced distance from its end. Said bead is designed to seat upon the neck portion $3^c$ of the rim-nut 3, while the portion of the cap below said bead is received inside the walls of said nut. Said bell shaped end has therein a plurality of slots 6 whereby is formed a plurality of resilient or yielding fingers 7. Said fingers are of outwardly bowed form and are adapted, following introduction through the neck portion $3^c$ of the nut, to partially underlie the shoulder formed in contracting the metal in the formation of said neck portion, thereby to secure the dust cap against chance withdrawal from its seated position.

The bell shaped end of the dust cap is of an oblong oval form, as shown in Fig. 3, and the neck portion $3^c$ of the nut is similarly shaped, as shown in Fig. 4, so that when said cap is seated with respect to said nut, relative rotation of said members is prevented. It will therefore be apparent that, since the cap can not rotate with respect to the stationary valve stem, retraction of said nut on said stem is prevented.

In applying the cap, the end of the fingers 7 being first inserted within the top of the neck $3^c$ of the nut, the cap is forcibly pressed inward, contracting said fingers until the bowed portions of the latter have passed by said neck, whereupon said fingers reexpand into cap-retaining relation to the nut. A strong outward pull obviously suffices to effect removal of the seated cap.

What is claimed is—

1. The combination with a tire-valve stem, of a rim nut screwed upon said stem, said nut being hollow and having a reduced neck, a stem-enclosing dust cap movable longitudinally to and from seated relation to said nut, said cap having resilient fingers adapted to enter and yieldingly engage said nut whereby it is retained in place, said cap and said stem being shaped relatively to prevent rotation of the former, and the interengaging parts of said cap and said nut being shaped relatively to prevent rotation of said nut.

2. The combination with a tire-valve stem, of a rim nut screwed upon said stem, said nut being hollow and having a reduced neck, a stem-enclosing dust cap movable longitudinally to and from seated relation to said nut, said cap having resilient fingers adapted to enter and yieldingly engage said nut whereby it is retained in place, said nut being non-rotatable with respect to said cap, and said cap being non-rotatable with respect to said stem.

3. The combination with a tire-valve stem, of a rim nut screwed upon said stem, said nut being hollow and having a reduced neck, a stem-enclosing dust cap movable longitudinally to and from seated relation to said nut, said cap having resilient fingers adapted to enter and yieldingly engage said nut whereby it is retained in place, said cap and said stem having interengaging flattened sides preventing rotation of the former, and said cap and said nut being shaped to prevent rotation of the latter with respect to the former.

4. The combination with a tire-valve stem, of a rim nut screwed upon said stem, said nut being hollow and having a reduced neck, a stem-enclosing dust cap movable longitudinally to and from seated relation to said nut, said cap having resilient fingers at its inner end adapted to seat within said nut for yieldingly retaining said cap in place and having an outwardly pressed bead for resting upon the neck of said nut, said cap and said stem having interengaging walls whereby rotation of the former is prevented, and said cap and said nut being shaped to prevent rotation of the latter with respect to the former.

5. The combination with a tire-valve stem, of a pressed sheet-metal rim nut for mounting upon said stem, and a stem-enclosing dust cap movable longitudinally to and from seated relation to said nut; said nut comprising a base, an upright body surrounding said base and terminating in a contracted neck, and an internal centrally located neck rising from said base and having internal screw threads for engaging the threads of said valve stem; and said cap having resilient fingers adapted to enter and yieldingly interlock with the contracted neck of said nut.

6. The combination with a tire-valve stem, of a pressed sheet-metal rim nut for mounting upon said stem, and a stem-enclosing dust cap movable longitudinally to and from seated relation to said nut; said nut comprising a base, an upright body surrounding said base and terminating in a contracted neck, and an interal centrally located neck rising from said base and having internal screw threads for engaging the threads of said valve stem; and said cap having a plurality of integral resilient terminal members adapted for introduction within said contracted neck and to engage yieldingly with the latter for retaining said cap in place.

In testimony whereof we affix our signatures in presence of two witnesses.

CLYDE R. CROSON.
JACOB W. KINDELBERGER.

Winesses:
G. O. SMITH,
H. E. DUNLAP.